Patented Apr. 10, 1934

1,953,951

UNITED STATES PATENT OFFICE 1,953,951

CHEMICAL TREATMENT OF SHELLAC

Willis A. Boughton, Cambridge, Mass., assignor to New England Mica Co., Waltham, Mass., a corporation of Massachusetts No Drawing. Application January 27, 1932, Serial No. 589,299

14 Claims. (Cl. 260—2)

This invention relates to the art of chemical treatment of shellac with the object of altering and improving its properties, and of forming new classes of compounds, or salts, or resins, therewith.

An object of the invention is to convert shellac into an improved resinous product showing a high degree of reversible thermoplasticity, and that is substantially insoluble in the usual organic solvents.

A further object of the invention is to provide an insoluble, relatively high temperature resisting, non-poisonous essentially inodorous organic thermoplastic compound which may be used for preparing molded articles, with or without the addition of fillers, or coloring matter.

A further object of the invention is to provide methods of altering the properties of the new resinous product described herein, in order to render it specifically applicable to uses for which the new product in its simplest original condition, because of the high maximum softening range of temperature and its unusual insolubility, cannot be employed.

A further object is to provide zinc-shellac resinous products containing other blendable organic substances producing thereby products with additively altered properties.

Other objects of the invention will be apparent to those skilled in such arts to which this invention appertains.

As is well-known, natural shellac when gently heated above its melting point, first melts, but as the application of heat is continued, the shellac becomes spongy, darkens, and dries, yielding a non-plastic porous mass. Charring takes place easily under such conditions.

This property has greatly limited the uses to which shellac may be applied. In spite of this, however, other favorable properties of this material have made it widely used, thus far capable of competing with a rapidly growing list of synthetic resins of various kinds. This invention aims, therefore, to modify the shellac molecule by chemical means in controllable ways so as to eliminate the unfortunate sensitiveness of the natural resin to heat, as well as to obtain products from it that, because of changes in solubility and/or thermal resistance, are still more useful than the natural resin.

I have discovered that such a modification may be carried out by means of a high temperature reaction between shellac and a basic zinc compound, preferably zinc oxide, in the absence of water or other aqueous liquids, forming a new product. The reaction appears to commence at about 120° C., as indicated by a change of color, and proceeds as the temperature is increased. There is no dry spongification. The resulting compound or resin is homogeneous, is reversibly thermoplastic up to its softening temperatures above 200° C., and the continuous application of heat tends to raise the softening range of temperature. Furthermore, this chemically modified form of shellac is essentially insoluble in all common organic solvents. While it is preferred that substantially all of the shellac be combined with the zinc compound, the presence of small quantities of uncombined shellac or of zinc oxide in the resulting compound will not impair its usefulness for many purposes.

The new product described herein will be referred to hereafter as the "new resin" or simply the "resin". I have found that this new resin is of value in various commercial thermoplastic processes. For example, when powdered or flaked it may be compressed in a mold or otherwise, at a suitable temperature within its softening range, whereupon the particles unite and when cooled it forms a mass that is unusually tough and hard, resisting fracture far better than shellac, and many other natural and synthetic resins.

Furthermore, the powdered new product may be first mixed with a neutral filler such as mica powder, kaolin, or powdered carbon, etc., and then molded, yielding a product having additive properties, as desired.

The powder may also be mixed with a fibrous material such as asbestos, or some form of natural or combined cellulose, and when compressed it is thereby further strengthened, made lighter, and given other desirable properties.

The method of manufacture of the new resin is as follows:—

Natural shellac, preferably purified, is suitably ground or powdered and mixed with preferably from about 30 percent to about 50 percent by weight of finely powdered zinc oxide, or with a suitable proportion of some other basic zinc compound, in the absence of water. The mixture is gently and uniformly heated, care being taken not to overheat locally, while the mixture is kept thoroughly stirred. Or the shellac may be melted and the desired quantity of dry zinc oxide or other dry zinc compound thoroughly mixed therewith. At a temperature slightly above 100° C., fluidity is rapidly developed due to the melting of the shellac, and the mass becomes a viscous liquid. At this stage the color is a light coffee brown, being simply that produced by mixing the dark brown of the shellac with the white of the zinc compound. Commercial zinc oxide, which is substantially anhydrous, may be used.

As the heating is continued the temperature gradually rises, and at 120-150° C. the color quickly changes to a characteristic dark pink, and gas begins to be evolved. These changes have been understood to indicate the development of a chemical reaction between the two materials. That such a reaction actually does take place is proved by the remarkable non-additive changes in the properties of the new resin, as described herein.

Ordinarily, heating of the mass is continued until a product is obtained having the desired softening range of temperature. That is to say, the reaction is a progressive one so far as properties such as softening range are concerned. If a low softening range is desired, heating is discontinued as soon as the reacting constituents have been brought into complete physical contact and enabled to form the desired chemical union, but if a maximum softening range is desired the heating is continued at above 200° C. for the necessary time. For example, if after being heated at about 150° C., for some minutes the mass is cooled, it solidifies at a temperature in the neighborhood of 130° C. to a hard, tough moderately insoluble resin, of homogeneous properties and differing markedly from shellac in those properties. Thermoplasticity without dry spongification has been developed, inasmuch as the resin can be repeatedly heated to softness and cooled to hardness without change in structure. It has developed considerable insolubility in organic solvents, those tried including alcohols such as methyl and ethyl alcohols, ethers such as ethyl ether, ketones such as acetone, hydrocarbons such as benzene, toluene and various petroleum distillates, terpenes such as turpentine, glycols such as ethylene glycol, and carbon disulfide and carbon tetrachloride. Slight surface softening without dissolving has been noticed with certain solvents.

Physically, it is extremely hard and tough and has a high breaking strength for a non-fibrous moldable organic material. Its surface is vitreous and cannot be scratched with the fingernail. Its fracture is conchoidal and its internal structure homogeneous.

In this intermediate stage, therefore, the new resin shows all its definite unique properties. These may now be enhanced by further heat treatment, which causes the reaction to progress as indicated by the continued evolution of small amounts of gas. As heat is further applied, therefore, and the temperature slowly raised, the softening temperature range is raised, the product becomes tougher, and insolubility appears to be increased as evidenced by decreased softening in the presence of certain solvents, without, however, being accompanied by any change in color, or in the property of reversible thermoplasticity, until at a temperature of 280-310° C. decomposition commences, the color darkens, and an odor of charring is noticed. Even at such elevated temperatures, however, and after decomposition has obviously commenced, the mass is still reversibly thermoplastic.

When, as usual, the heating is stopped below the decomposition temperature, at 250° C., or thereabouts, the resin has acquired approximately its maximum properties of hardness, toughness, high temperature reversible thermoplasticity, and insolubility. Its physical appearance is not changed, however. The softening range at this stage is upwards of 200° C.

With bleached shellac the procedure is the same as with the natural shellac described above, and the product has the same properties except for the color which is a very light ivory. This ivory colored product may, if desired, have incorporated with it suitable coloring matter or colored fillers to obtain any desired colored product.

In use, it is obvious that the molding temperature of the resulting product must be adapted to the softening range of the resin used. The process of admixture with fillers of various kinds, and of incorporation into or with fabrics or fibres or the like, will be obvious to those skilled in such arts and need not be described here.

I am aware that shellac has been modified chemically in other ways. For example, the process of Simonsen and Blair (U. S. Patent 1,309,967), which appears at first sight to be similar to that described herein, involves the reaction of about 6 percent of zinc oxide equivalent with an alkaline aqueous solution of shellac. Simonsen's zinc salt as made according to his directions using zinc acetate, or other zinc compounds as described in his patent, however, differs from mine in many ways. It is prepared by aqueous reaction, whereas mine is prepared dry. The color of Simonsen's product is liver brown (very like that of shellac itself), whereas with natural shellac my product has a dark pink color. Simonsen's product softens at 60° C. and bubbles violently at 120° C.; mine in its first stages softens at about 100° C. and some gas is evolved. At higher temperatures Simonsen's product thickens, becomes spongy, and contrary to his statement decomposition sets in at about 180° C.; my product may be heated to upwards of 280° C. and decomposition does not set in until this high temperature range is reached.

By stoichiometry, it may easily be calculated that the proportion of zinc oxide equivalent required for Simonsen's reaction is less than 6 percent. (100 parts shellac+4.5 parts caustic soda=about 104 parts sodium shellac compound. Of this, 100 parts is equivalent to not more than 25 parts of lead acetate. 100/104 times 25=not more than 23 parts equivalent of original shellac. The molecular weight of lead acetate is about 380, and that of zinc oxide about 81. 81/380 times 23=less than 6 parts of zinc oxide equivalent per 100 of shellac, or less than a 6 percent proportion.)

In the production of Simonsen's "superior product" the proportion of metal radical is still further lowered by admixture of untreated shellac with the treated product.

It should further be noted that Simonsen preferably prepared his salt by first forming an aqueous solution of the sodium compound of shellac, then by metathetical reaction making his heavy metal compound. In my preferred process, reaction proceeds directly between shellac and zinc oxide in the absence of water or organic solvent.

It is obvious, therefore, that the reaction product I have obtained is different from Simonsen's, since it differs in proportions of reactants used, in the method of manufacture, in the temperature of reaction, and in the important properties of the final products. This may be said also of other known chemically modified forms of shellac.

In an earlier application (Ser. No. 469,205, filed

July 19, 1930), I have described the use of this new resin as a binder in the manufacture of laminated mica plate of new and useful properties. Since the new resin is insoluble in organic solvents, it was necessary in this earlier work to manufacture it in the mica plate after the latter had been built up. As I have described in that application, with a shellac solution in alcohol is incorporated about 35 percent by weight (dry shellac basis) of zinc oxide, the mixture kept well stirred and applied to mica films as usual in the building of a mica plate; the solvent is then evaporated, the plate pressed and heated under pressure above the temperature at which the high temperature reaction between the zinc oxide and shellac is effected, and the new compound produced in situ. Such a plate shows many superior properties.

Obviously, therefore, the high temperature reaction described in the present specification, may also be brought about by dissolving the shellac in an organic solvent, adding the zinc oxide, stirring and heating until the solvent is evaporated and the temperature of the constantly fluid mass reaches the point (about 120° C.) at which the reaction takes place. The resin made in this way differs in no essential particular from that manufactured by the dry process described above.

In the early experiments on the development of this resin as a thermoplastic, the reaction was always carried on as just described, by the preliminary employment of an organic shellac solvent. Later the conditions were discovered under which the solvent could be eliminated and the new product formed from the dry constituents, and thereafter manipulated, and the cost of manufacture of the bulk resin was thereby reduced to approximately that of the two essential reactants.

Having described in detail the preparation of the resin by thermic reaction, its properties and some of its uses, I shall now proceed to show how these properties can be still further changed, partly by physical and partly by chemical treatment.

The prepared resin is peculiarly characterized by its high softening range of temperature in the final stage. It is desirable to be able to lower this, or at least to control it, so that a resin of any desired softening range may be produced from the completely reacted product. This I prefer to do by admixture at high temperature in effective amounts with an organic liquid of relatively high boiling point, of the general class including triethanolamine (boiling point 277° C., 150 mm. pressure), ethylene glycol (boiling point 195° C.), tricresyl phosphate (boiling point 265° C., 20 mm. pressure), and certain organic esters such as butyl phthalate (boiling point 203° C.–206° C. at 20 mm. pressure). These substances are occasionally used to dissolve, disperse or break up organic materials, and this seems to be their function in their action on the resin. Furthermore, a substance of this group may be added directly to the unreacted resin constituents and the reaction carried on in its presence without affecting the reaction product in any other way than that of lowering its final softening range of temperature. These high boiling liquids may be added to the new resin, or to the components during its manufacture, in quantities from traces to fifty percent, and over; the resulting resin compounds form fluids of lessened viscosity at temperatures between 250° C. and 300° C. in rough proportion to the amount of added liquid present.

For example, I take 200 parts by weight of ground shellac, 70 parts by weight of dry zinc oxide and 48 parts of triethanolamine (about 15 percent by weight), mix thoroughly, and while stirring the mixture constantly, heat it. At about 120° C., the resin reaction commences to take place, as evidenced by development of the characteristic color. Heating and stirring are continued considerably above that temperature, at 200° C. or higher, although the exact temperature is not important; and the resin and diluent are then easily and completely mixed and the mass becomes homogeneous. The mixture is allowed to cool at once to obtain a softened resin of the lowest softening range, which in this case is 100° C. to 150° C. But higher softening ranges can be obtained by continuing the heating, as described heretofore. I may, just as feasibly, start with 85 parts by weight of the new resin and 15 parts of triethanolamine, heat them together and stir. As the resin softens, it may then be mixed with the liquid, rapidly and easily forming a homogeneous mixture that when cooled is in no essential way different from that prepared by conducting the resin reaction in the presence of the liquid as described above. Thus it appears that the function of the liquid is that of fluid diluent of the new resin.

When a still softer resin is desired a greater proportion of triethanolamine is used. Twenty-five percent by weight, for example, gives a minimum softening range of 50° C. or thereabouts. Such a resin when cold is soft enough to be indented by pressure of the fingernail, and when in slab form and folded, or stretched, shows a noticeable resistance to permanent deformation, tending to resume its cast shape.

Similarly, using a 20 percent proportion of ethylene glycol a homogeneous resin is obtained that has a softening range in the vicinity of 60° C.–100° C. This also exhibits the property of elasticity or resistance to permanent deformation to a noticeable extent.

The solubilities of such softened resins are different from those of the untreated resin, because of this treatment, as is to be expected. While they are insoluble in almost all organic solvents, they are softened by such liquids as alcohol and ethyl acetate; and if the percentage of softening agent is high, they may become soluble. For example, the softened resin made with 25 percent of triethanolamine is soluble in alcohol, softened by ethylacetate, benzene, carbon disulfide, and but little or not at all affected by acetone, carbon tetrachloride, ether, toluene, gasolene, or turpentine.

The solubility may be affected in a different way by high temperature reaction with an oil. This reaction is of the type that has been described in another application for patent (Boughton, Reaction products of resins and certain other materials, Serial Number 556,297, filed August 10, 1931) and is not claimed as a novelty here except as a specific example not previously described).

Briefly, to carry out this reaction I melt the pure resin and when smoothly melted I add a predetermined percentage of high temperature reactant, raise the temperature to 200° C.–300° C. and keep it there until the reaction is completed as indicated by quiescence. The product is then cooled. Specifically, the procedure is substantially as follows—100 parts by weight of the new resin are melted and the desired proportion in effective amounts (up to about 50 percent) of an oil such as tung oil, linseed oil, cottonseed oil, etc., is added and the temperature maintained at 200° C.–280° C., while the mixture is stirred. There is no indication of solubility or reaction at first, but eventually large quantities of gas are rapidly evolved and complete homogeneity of the mixture is obtained. The product has modified properties, the most important one being solubility in turpentine and other solvents.

To produce one type of product, I melt seven to nine parts by weight of the new resin, and add one to three parts of oil, preferably linseed or China-wood oil, (tung oil). At first the melted resin and oil show no signs of reaction or even mixing, but at the maximum temperature there is a sudden and marked gas evolution which soon thereafter quiets down, indicating completion of the reaction.

Such a reacted product when cooled is soluble in various solvents such as carbon tetrachloride, turpentine, etc., and in such solution shows properties characteristic of paint-making resins of high quality, namely, forms films that are glossy, tough and flexible.

Such high temperature reactions with consequent modification of properties may also be carried out with other substances as described in detail in the above mentioned application for patent, Serial Number 556,297.

I may further modify the properties of the new resin, as well as in specific cases cheapen its cost by preparing it in the presence of a proportion in effective amounts of another resin that is soluble or blendable therewith when the two are in solution or melted, of the general type capable of forming a liquid of moderate to low viscosity when melted. For example, 200 parts of shellac, 200 parts of rosin, and 80 parts of zinc oxide by weight when heated and stirred react and/or mix to form a homogeneous, hard, tough, resinous mass with these desirable properties somewhat lessened, as compared with the pure new resin.

Similarly, I take 200 parts of shellac, 200 parts of a meltable vinyl resin and 80 parts of zinc oxide, treat the mixture in the same manner and obtain a mixed resin of enhanced hardness.

The following compositions are illustrations of a wide range in proportions of suitable diluting resins that may be added to zinc-shellac compounds.

The proportions are by weight:—

1. Shellac 50; zinc oxide 15, rosin 40.
2. Shellac 50; zinc oxide 15, copal 35.
3. Shellac 50; zinc oxide 15, coumarone resin 50.
4. Shellac 50; zinc oxide 15, chlorinated diphenyl resin 25.
5. Shellac 50; zinc oxide 15, teglac (unknown composition) 10.
6. Shellac 50; zinc oxide 15, chicle 5.

Other natural or synthetic resins which are blendable or soluble may also be used. The solubility of such a product in common organic solvents has been somewhat affected as indicated in the former example by extraction with some solvents (carbon disulfide, ether, toluene), and softening and extraction in others (alcohol, acetone, benzene, ethyl acetate, gasolene). So far as is now known, the function of the added resin is that of a diluent; it may have other functions not yet known.

I claim:—

1. The method of making a shellac-metal-radical compound, which comprises effecting a chemical reaction between from about ten parts to about thirteen parts of melted shellac and from about ten parts to about seven parts of substantially anhydrous zinc oxide in the absence of water, at temperatures between 120° C. and 280° C. and maintaining the mass at the reacting temperature until a substantial amount of the shellac acids have been neutralized.

2. The method of making a shellac-metal-radical compound, which comprises effecting a chemical reaction between from about ten parts to about thirteen parts of melted shellac and from about ten parts to about seven parts of substantially anhydrous zinc oxide in the absence of water, and in the presence of a high boiling blendable organic liquid the molecule of which contains at least two organic radicals at temperatures between 120° C. and 280° C., and maintaining the mass at the reacting temperature until a substantial amount of the shellac acids have been neutralized.

3. The method of making a shellac-metal-radical compound, which comprises effecting a chemical reaction between from about ten parts to about thirteen parts of melted shellac and from about ten parts to about seven parts of substantially anhydrous zinc oxide in the absence of water, and in the presence of from about five percent to about fifty percent of a high boiling blendable organic liquid of the class consisting of triethanolamine, ethylene glycol, tricresyl phosphate, at temperatures between 120° C. and 280° C., and maintaining the mass at the reacting temperature until a substantial amount of the shellac acids have been neutralized.

4. The method of making a shellac-metal-radical compound, which comprises effecting a chemical reaction between from about ten parts to about thirteen parts of melted shellac and from about ten parts to about seven parts of substantially anhydrous zinc oxide in the absence of water, at temperatures between 120° C. and 280° C. and maintaining the mass at the reacting temperature until a substantial amount of the shellac acids have been neutralized, then adding thereto from about five percent to about fifty percent of linseed oil, and heating and agitating the mass until said oil has blended therewith.

5. The method of making a shellac-metal-radical compound, which comprises effecting a chemical reaction between from about two parts to about thirteen parts of melted shellac and from about ten parts to about seven parts of substantially anhydrous zinc oxide in the absence of water, at temperatures between 120° C. and 280° C. and maintaining the mass at the reacting temperature until a substantial amount of the shellac acids have been neutralized, then adding thereto from about five percent to about fifty percent of China-wood oil, and heating and agitating the mass until said oil has blended therewith.

6. The product containing the zinc-shellac-compound resulting from the reaction between ten to thirteen parts of shellac and seven to ten parts of zinc oxide at temperatures between 120° C. to 280° C. and of from five to fifty percent of a high boiling blendable organic liquid.

7. A zinc compound of shellac consisting of from about ten to thirteen parts of shellac chemically combined with from about ten to seven parts of anhydrous zinc oxide in the absence of water.

8. A composition of matter consisting of a mass of inert matter thoroughly mixed and bonded with the chemical reaction product of shellac and not less than thirty percent by weight of the shellac of an anhydrous basic zinc compound, to substantially neutralize the shellac acids.

9. A composition of matter consisting of a mass of inert matter thoroughly mixed and bonded with the chemical reaction product of from about ten parts to about thirteen parts of shellac and from about ten parts to about seven parts of an anhydrous basic zinc compound.

10. A composition of matter comprising the product obtained from a high temperature reaction, of above about 150° C., with a mass containing between from about ten parts to about thirteen parts of shellac, and from about ten parts to about seven parts of substantially anhydrous zinc oxide.

11. The product containing the zinc-shellac compound resulting from the reaction between from about ten to thirteen parts of shellac and from about three to ten parts of anhydrous zinc oxide at temperatures between 120° C. to 280° C. and of from about twenty-five parts to about fifty parts by weight of a blendable resin.

12. The product containing the zinc-shellac compound resulting from the reaction between from ten to thirteen parts of shellac and from three to ten parts of anhydrous zinc oxide at a temperature between 120° C. to 280° C. and of from five to seventy-five parts of a blendable synthetic resin.

13. The product having a fluid viscosity between temperatures of 250° C. to 300° C. containing the zinc-shellac compound resulting from the reaction between from about ten to thirteen parts of shellac and from about three to ten parts of anhydrous zinc oxide at temperatures between 120° C. to 280° C. and of from five to seventy-five parts of a blendable resin.

14. A reversibly thermoplastic chemical compound consisting of the reaction product of shellac and not less than thirty percent by weight of the shellac of an anhydrous basic zinc compound, said shellac compound having a higher melting point than shellac, a dark pink to purple color, insoluble in alcohol and other ordinary organic solvents, and greater hardness than shellac.

WILLIS A. BOUGHTON.